Aug. 18, 1925.

Re. 16,146

C. H. DOUGLASS

SELF THREADING SHUTTLE

Original Filed Nov. 11, 1924 2 Sheets-Sheet 1

Inventor
Charles H. Douglas, Deceased,
By Anna C. Douglass, Executrix.
BY Robt. P. Harris.
ATTORNEY Aug. 18, 1925

Re. 16,146

C. H. DOUGLASS

SELF THREADING SHUTTLE

Original Filed Nov. 11, 1924 2 Sheets-Sheet 2

Inventor:
Charles H. Douglas, deceased by,
Anna C. Douglass, executrix.
BY Robert P. Harris,
ATTORNEY Reissued Aug. 18, 1925.

Re. 16,146

UNITED STATES PATENT OFFICE.

CHARLES H. DOUGLASS, DECEASED, LATE OF CRANSTON, RHODE ISLAND; BY ANNA C. DOUGLASS, EXECUTRIX, OF PROVIDENCE, RHODE ISLAND, ASSIGNOR TO DRAPER CORPORATION, OF HOPEDALE, MASSACHUSETTS, A CORPORATION OF MAINE.

SELF-THREADING SHUTTLE.

Original No. 1,531,082, dated March 24, 1925, Serial No. 749,174, filed November 11, 1924. Application for reissue filed July 10, 1925. Serial No. 42,851.

*To all whom it may concern:*

Be it known that CHARLES H. DOUGLASS, citizen of the United States, formerly residing at Cranston, in the county of Providence and State of Rhode Island, now deceased, did invent certain new and useful Improvements in Self-Threading Shuttles, for which Letters Patent No. 1,531,082 were granted under date of March 24, 1925, and that Anna C. Douglass, executrix of Charles H. Douglass, now makes application for reissue of said Letters Patent, of which the following is a specification.

The invention relates to self-threading shuttles and particularly to the delivery end thereof including the threading block therein located.

Heretofore the delivery end of shuttle frames or bodies at a point above and in the rear of the delivery eye have presented a joint occasioned by a laterally projecting metal lip or the like upon the metal threading block seated in the wood of the body. This joint has invited wear, accidental engagement of the filling, and abrasion or splitting of the wood adjacent the lip during the reciprocation of the shuttle. This has also increased the expense of construction of the shuttle at the point indicated.

The essential objects of the invention are to overcome the above disadvantages, and to increase the strength of the delivery end of the shuttle; to facilitate the admission of the filling; and to insure a position of the threading block remote from the lateral portions of the nose or delivery end of the shuttle.

To the above ends essentially the invention consists in such parts and in such combinations of parts as fall within the scope of the appended claims.

In the accompanying drawings which form a part of this specification—

Figure 1:
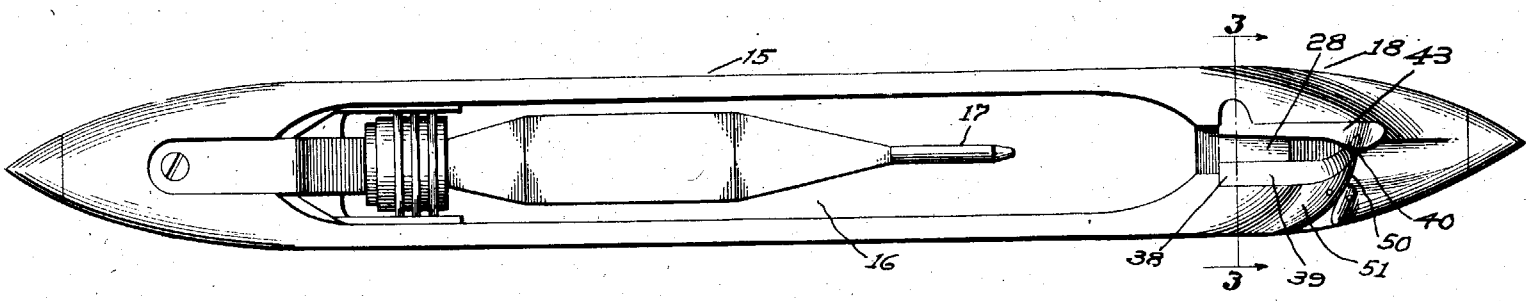
Figure 3:
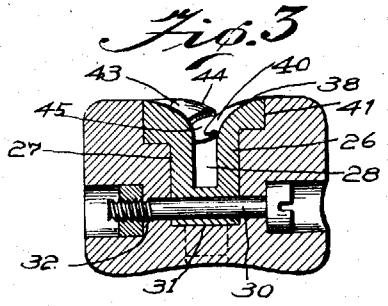
Figure 2:
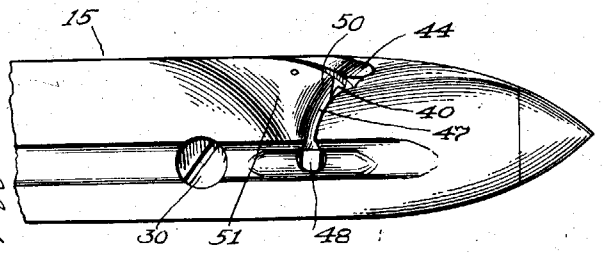
Figure 4:
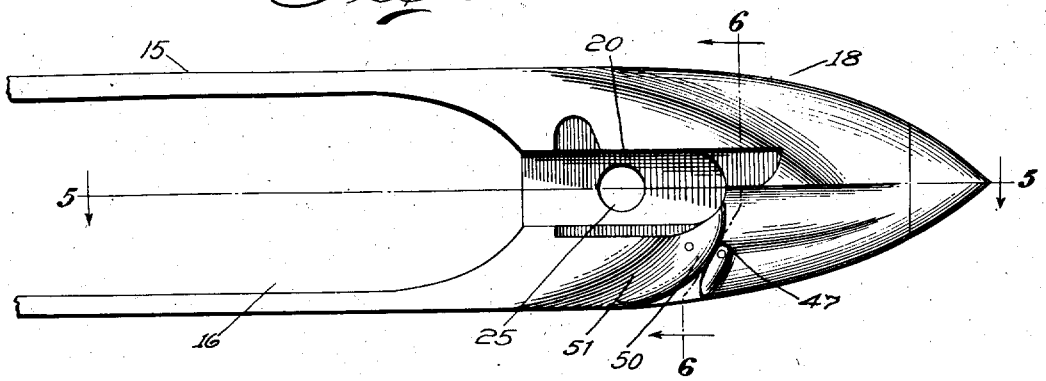
Figure 5:
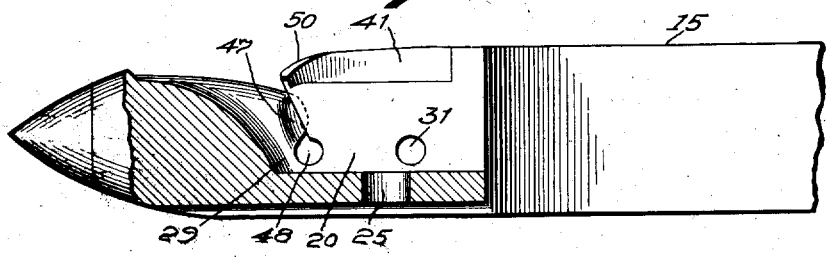
Figure 6:
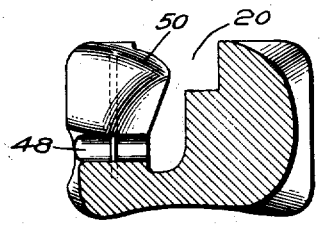
Figure 7:
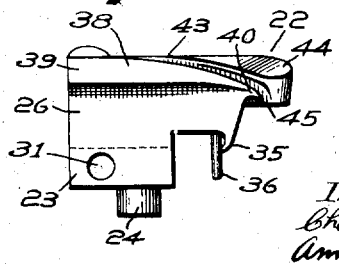
Figure 8:
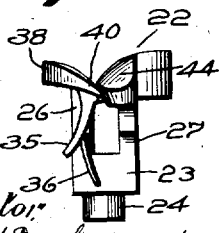

Fig. 1 is a plan view of a shuttle embodying the invention;

Fig. 2, a side elevation of the delivery end of the same;

Fig. 3, a section on the line 3—3 of Figure 1;

Fig. 4, a plan view of the delivery end of the shuttle, with the threading block removed;

Figs. 5 and 6, sections of the same on lines 5—5 and 6—6 respectively of Figure 4, and Figs. 7 and 8, a side elevation and a front end elevation respectively of the threading block.

Like characters of reference indicate like parts throughout the views.

In the construction of the shuttle herein shown 15 represents the frame or body portion provided with the usual bobbin chamber 16 for a bobbin 17. The delivery end or nose portion of the shuttle is indicated by 18. Axially of the body at the forward end of the bobbin chamber in the portion 18 of the shuttle is a longitudinally disposed cavity 20 containing a delivery or guide block, indicated in a general way by 22, comprising a base 23, a stud 24 thereon seated in an opening 25, parallel or spaced vertical side walls or webs 26 and 27 bounding a longitudinal thread passage 28. A portion 29 of the cavity 20 extends beyond the end of the block and constitutes a part of the passage 28. The block 22 is fixed in place by the usual transversely disposed screw 30 traversing openings 31 and 32 in the block and in the body. Upon the extended forward portion of the wall 26 is the usual depending heel 35, and in the rear thereof is a bearing pin 36. Upon the top of the wall 26 is a laterally enlarged or undercut beak 38 whose body portion 39 is longitudinally disposed and whose point 40 is inwardly directed. The lateral enlargement of the beak fits in a cavity 41. Integral with the top of the wall 27 is a longitudinally disposed forwardly directed finger 43 whose extremity 44 is laterally broadened and provided with a lateral recess 45 into which the beak point 40 enters. This point is sufficiently spaced from the overlapping portion 44 to admit the introduction of a filling thread into the passage 28.

A transversely disposed rearwardly inclined curvilinear thread passage 47 extends from the longitudinal passage to the lateral face of the nose and communicates at its lower portion with the delivery eye 48. One wall of the passage 47 is formed by the convex face of an inwardly directed beak 50 which extends from one side of the nose 18 to the front of the beak point 40, so that the wooden beak 50 embraces the side and forward end portion of the metallic beak.

The filling thread passes from the bobbin through the passages and the delivery eye in the usual manner.

It will be observed that the presence of the beak 50 reduces the width of the delivery end of the shuttle at the point 51 where the cheek of the shuttle is usually so excessively prominent as to most readily interfere with the shuttle box; that no lateral lugs are by this construction required on the portion 39, hence there is absent any joint of metal or wood near the side of the shuttle body to occasion exposure to violent contact with the shuttle box; that the inward position of the wooden beak as well as its support and protection of the metal beak end 40 strengthens the structure; and that the beak 50 increases the guiding area of the filler.

What is claimed is:

1. A shuttle comprising a body and a delivery end, a guide block disposed centrally of the delivery end comprising parallel side walls bounding a longitudinal thread passage, a longitudinally disposed forwardly projecting finger on one wall, a longitudinally disposed beak on the second wall terminating adjacent the projecting portion of the finger, the delivery end being provided with a laterally disposed thread passage communicating with the longitudinal thread passage, and an auxiliary beak extending from the side of the delivery end to the forward portion of the first beak.

2. A self-threading shuttle for looms having a longitudinally extending thread passage and side delivery eye, a metallic beak having its end directed towards the longitudinally extending thread passage, and a wooden beak covering the side and forward portion of the metallic beak and forming a jointless guide passage for the thread to the side delivery eye.

3. A self-threading shuttle for looms having a longitudinally extending thread passage and side delivery eye, a metallic beak having its end directed towards the longitudinally extending thread passage, and a wooden beak formed by the wood of the shuttle to cover the side and forward portion of the metallic beak and providing a jointless guide passage for the thread to the side delivery eye.

In testimony whereof, I have affixed my signature to this specification.

ANNA C. DOUGLASS,
*Executrix of Charles H. Douglass, deceased.*